US012148338B2

(12) United States Patent
Bai et al.

(10) Patent No.: US 12,148,338 B2
(45) Date of Patent: Nov. 19, 2024

(54) DISPLAY MODULE INCLUDING GATE CONTROL CHIP AND ELECTRONIC TERMINAL INCLUDING THE SAME

(71) Applicant: SHENZHEN CHINA STAR OPTOELECTRONICS SEMICONDUCTOR DISPLAY TECHNOLOGY CO., LTD., Guangdong (CN)

(72) Inventors: Yunhai Bai, Guangdong (CN); Guoqing Gao, Guangdong (CN); Xinying Luo, Guangdong (CN); Jinao Chen, Guangdong (CN); Jianzhong Xiao, Guangdong (CN); Mingyao Chen, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,869

(22) PCT Filed: Apr. 18, 2022

(86) PCT No.: PCT/CN2022/087358
§ 371 (c)(1),
(2) Date: May 10, 2022

(87) PCT Pub. No.: WO2023/184608
PCT Pub. Date: Oct. 5, 2023

(65) Prior Publication Data

US 2024/0153422 A1 May 9, 2024

(30) Foreign Application Priority Data

Apr. 2, 2022 (CN) ......................... 202210349713.3

(51) Int. Cl.
*G09G 3/20* (2006.01)

(52) U.S. Cl.
CPC ....... *G09G 3/20* (2013.01); *G09G 2300/0408* (2013.01); *G09G 2330/021* (2013.01); *G09G 2330/08* (2013.01)

(58) Field of Classification Search
None
See application file for complete search history.

(56) References Cited

U.S. PATENT DOCUMENTS

2017/0256216 A1* 9/2017 Cao .......................... G09G 3/36
2017/0261800 A1* 9/2017 Zhang .................. G09G 3/2096
(Continued)

FOREIGN PATENT DOCUMENTS

CN 106128384 A 11/2016
CN 107799070 A 3/2018
(Continued)

OTHER PUBLICATIONS

International Search Report in International application No. PCT/CN2022/087358, mailed on Nov. 28, 2022.
(Continued)

*Primary Examiner* — Amr A Awad
*Assistant Examiner* — Donna V Bocar
(74) *Attorney, Agent, or Firm* — PV IP PC; Wei Te Chung

(57) ABSTRACT

The present disclosure provides a display module and an electronic terminal. The display module includes a panel including a display area and a non-display area on at least one side of the display area, where a gate driving circuit is disposed in the non-display area; and a gate control chip including a first output pin and a second output pin, where both the first output pin and the second output pin are electrically connected to the gate driving circuit, where, the
(Continued)

gate control chip is configured to, when a first signal outputted from the first output pin is abnormal, control the second output pin to output a second signal, and control the first output pin not to output the first signal.

13 Claims, 3 Drawing Sheets

(56) References Cited

U.S. PATENT DOCUMENTS

| | | | | |
|---|---|---|---|---|
| 2019/0195940 | A1* | 6/2019 | Chen | G01R 31/2825 |
| 2021/0241663 | A1 | 8/2021 | Li et al. | |
| 2021/0247641 | A1* | 8/2021 | Shimizu | G02F 1/1345 |
| 2021/0327382 | A1* | 10/2021 | Tang | G09G 3/3674 |

FOREIGN PATENT DOCUMENTS

| | | | |
|---|---|---|---|
| CN | 108877683 | A | 11/2018 |
| CN | 109445137 | A | 3/2019 |
| CN | 110379387 | A | 10/2019 |
| CN | 113972815 | A | 1/2022 |

OTHER PUBLICATIONS

Written Opinion of the International Search Authority in International application No. PCT/CN2022/087358, mailed on Nov. 28, 2022.

* cited by examiner

DISPLAY MODULE INCLUDING GATE CONTROL CHIP AND ELECTRONIC TERMINAL INCLUDING THE SAME

TECHNICAL FIELD

The present disclosure relates to a display technology field, in particular to the field of display panel manufacturing technologies, and specifically, to a display module and an electronic terminal.

BACKGROUND

GOA (Gate Driver on Array) technology facilitates a design of a narrow border of a display screen, so it is widely used.

The GOA circuit disposed on the array substrate needs to be electrically connected to a plurality of wirings to load GOA control signals. However, the plurality of wirings and electronic components are disposed on the array substrate, which causes the plurality of wirings for transmitting the GOA control signal to be excessively close to each other. In addition, a short circuit occurs among the plurality of wirings for transmitting the GOA control signals due to a process of the GOA circuit or the like, which causes the GOA circuit to operate abnormally, so that the display panel is discarded, thereby reducing a yield of the display panel.

Therefore, it is necessary to provide a display panel and an electronic terminal that can reduce a risk of an abnormal operation of the GOA circuit.

TECHNICAL PROBLEMS

Embodiments of the present disclosure provide a display module and an electronic terminal, so as to resolve an existing technical problem of a higher risk of the abnormal operation of the GOA circuit due to the short circuit among the plurality of wirings for transmitting the GOA control signals.

TECHNICAL SOLUTIONS TO THE PROBLEM

An embodiment of the present disclosure provides a display module, including:

- a panel including a display area and a non-display area located on at least one side of the display area, wherein a gate driving circuit is disposed in the non-display area; and
- a gate control chip including a first output pin and a second output pin, wherein both the first output pin and the second output pin are electrically connected to the gate driving circuit;
- wherein, the gate control chip is configured to, when a first signal outputted from the first output pin is abnormal, control the second output pin to output a second signal, and control the first output pin not to output the first signal.

BENEFICIAL EFFECTS

The present disclosure provides the display module and the electronic terminal, including, the panel including the display area and the non-display area on at least one side of the display area, wherein the gate driving circuit is disposed in the non-display area; and the gate control chip including the first output pin and the second output pin, wherein both the first output pin and the second output pin are electrically connected to the gate driving circuit; wherein, the gate control chip is configured to, when the first signal outputted from the first output pin is abnormal, control the second output pin to output the second signal, and control the first output pin not to output the first signal. In the present disclosure, by disposing the gate control chip that has a function of identifying the first signal and includes the first output pin and the second output pin that are both electrically connected to the gate driving circuit, the second signal may be loaded to the gate driving circuit instead of the first signal when the first signal is abnormal, thereby avoiding the abnormal operation of the gate driving circuit, improving reliability of the operation of the gate driving circuit, and improving the yield of the display module.

BRIEF DESCRIPTION OF THE DRAWINGS

The present disclosure is further illustrated below by referring to the accompanying drawings. It should be noted that the accompanying drawings in the following description are merely intended to explain some embodiments of the present disclosure. A person skilled in the art may still obtain other drawings from these accompanying drawings without creative efforts.

EMBODIMENTS OF THE PRESENT DISCLOSURE

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

The terms “first”, “second”, “third”, and “fourth” and the like in the present disclosure are used to distinguish different objects, and are not used to describe a specific order. In addition, the terms “include” and “have” and any variations thereof are not exclusive, intend to cover other necessary inclusions. “A high potential signal” may be understood as a constant voltage signal with a relatively high voltage, and a specific voltage value is not limited. For example, a process, a method, a system, a product, or a device that includes a series of steps or modules is not limited to the listed steps or modules, but optionally further includes the unlisted steps or modules, or optionally further includes another step or module inherent to the process, the method, the product, or the device.

Referring to “embodiments” in this specification means that specific features, structures, or characteristics described in connection with the embodiments may be included in at least one embodiment of the present disclosure. The phrase “embodiments” appearing at all locations in the specification does not necessarily refer to a same embodiment, or is an independent or alternative embodiment that is mutually exclusive from another embodiment. It is explicitly and implicitly understood by a person skilled in the art that the embodiments described in this specification may be combined with other embodiments.

An embodiment of the present disclosure provides a display module. The display module includes, but not limited to, the following embodiments and a combination of the following embodiments.

Figure 1:
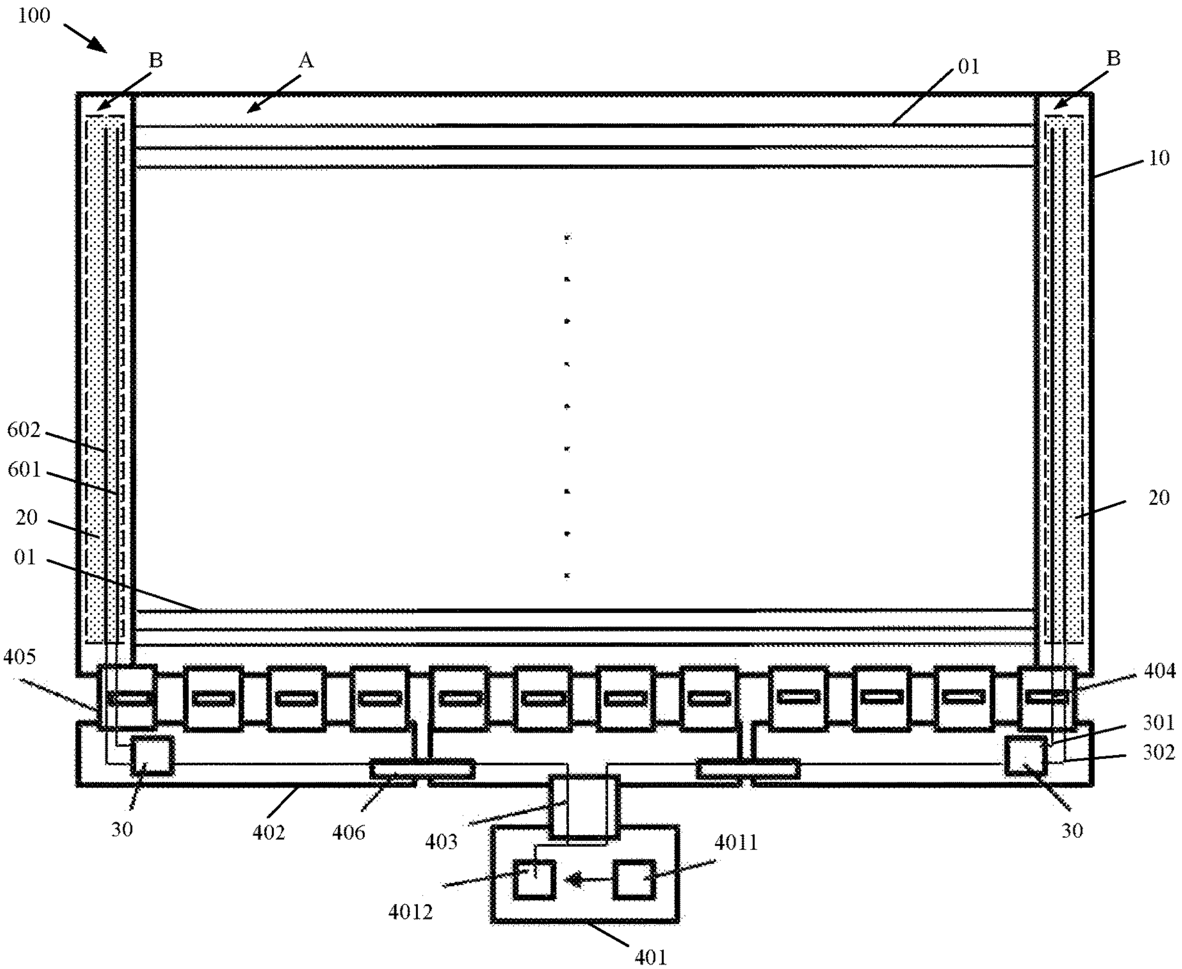
FIG. 1 is a schematic top view of a display module according to an embodiment of the present disclosure.
Figure 2:
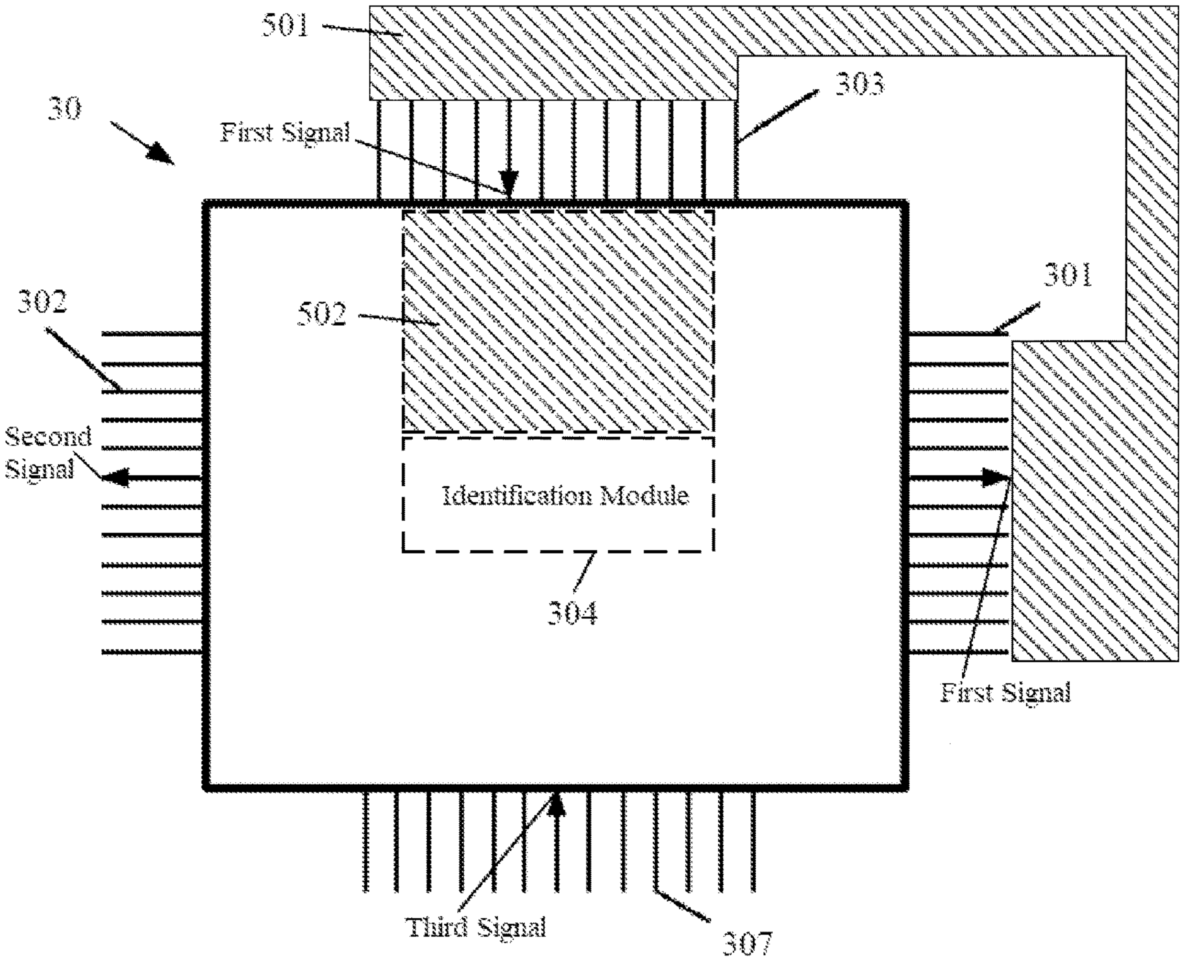
FIG. 2 is a schematic top view of a gate control chip according to an embodiment of the present disclosure.

In an embodiment, in combination with FIGS. 1 and 2, the display module 100 includes: a panel 10 including a display area A and a non-display area B on at least one side of the display area A, where a gate driving circuit 20 is disposed in the non-display area B; and a gate control chip 30 including a first output pin 301 and a second output pin 302, where both the first output pin 301 and the second output pin 302 are electrically connected to the gate driving circuit 20; where, the gate control chip 30 is configured to, when a first signal outputted from the first output pin 301 is abnormal, control the second output pin 302 to output a second signal, and control the first output pin 301 not to output the first signal.

A specific distribution of the non-display areas B and the gate driving circuit 20 is not limited in this embodiment. Herein, an example that each of the non-display areas B is located on opposite sides of the display area A and the gate driving circuit 20 is disposed in the non-display area B is taken. Specifically, as shown in FIG. 1, a plurality of gate lines 01, and a plurality of pixel driving circuits and a plurality of sub-pixels that are in a one-to-one correspondence and electrically connected with each other may be disposed in the display area A of the panel 10. Each of the gate lines 01 may be electrically connected to the plurality of pixel driving circuits to correspondingly drive the plurality of sub-pixels. For example, the plurality of gate lines 01 may are extended in a horizontal direction and are arranged in a vertical direction. Each of the gate lines 01 may be electrically connected to the plurality of pixel driving circuits arranged in the horizontal direction to drive the plurality of sub-pixels in a row corresponding to the gate line. Further, each of the gate lines 01 may be extended to the non-display area B and electrically connected to at least one gate driving circuit 20, so as to receive a gate signal for driving the plurality of sub-pixels in the row corresponding to the gate line.

Further, as shown in FIG. 1, the display module 100 may further include a first circuit board 401, a second circuit board 402, a first connector 403, and a source driving chip 404, where a timing control chip 4011 and a power management chip 4012 that are electrically connected with each other may be disposed on the first circuit board 401. The first connector 403 is electrically connected between the first circuit board 401 and the second circuit board 402, a gate control chip 30 may be disposed on the second circuit board 402, and the source driving chip 404 is electrically connected to the second circuit board 402 by using a COF (Chip On Flex, also called a chip-on-film) technology, that is, the second circuit board 402 is electrically connected to a chip-on-film 405 that includes the source driving chip 404. Further, the first circuit board 401 and the second circuit board 402 may be flexible circuit boards or rigid circuit boards at the same time or not at the same time. The first connector 403 may be, but is not limited to, a flexible flat cable connector. One second circuit board 402 may be electrically connected to the first circuit board 401 via the first connector 403. Two adjacent second circuit boards 402 may be electrically connected by using, but being not limited to, a second connector 406 made of a flexible circuit board. Each of the second circuit boards 402 may be electrically connected to a plurality of chip-on-films 405.

Specifically, in combination with the foregoing, the power management chip 4012 may receive and correspondingly convert an initial gate control signal and an initial source control signal that are generated by the timing control chip 4011 into a target gate control signal and a target source control signal, respectively. The power management chip 4012 may transmit the target gate control signal to the gate control chip 30 by using a line located on the first circuit board 401, the first connector 403, the second connector 406, and a line located on the second circuit board 402. In the meanwhile, the power management chip 4012 may transmit the target source control signal to the source driving chip 404 included in the chip-on-film 405 by using a line located on the first circuit board 401, the first connector 403, the second connector 406, and a line located on the second circuit board 402. Further, in combination with the foregoing, the gate control chip 30 and the gate driving circuit 20 control a gate signal on the gate line 01, and the source driving chip 404 controls a data signal on the data line to jointly drive a plurality of sub-pixels to emit light. Each of the plurality of pixel driving circuits electrically connected to the same data line may be respectively electrically connected to different one of the plurality of gate lines.

It may be understood that the display module 100 in this embodiment is further provided with a gate control chip 30 including a first output pin 301 and a second output pin 302 that are both electrically connected to the gate driving circuit 20. When a first signal outputted from the first output pin 301 is abnormal, the gate control chip 30 may control the second output pin 302 to output a second signal, and control the first output pin 301 not to output the first signal. That is, when the first signal is abnormal, the second signal may be loaded to the gate driving circuit 20 instead of the first signal, to drive the gate driving circuit 20 to operate, so as to avoid an abnormal operation of the gate driving circuit 20 due to the abnormality of the first signal. In the meanwhile, the gate control chip 30 may control the first output pin 301 not to output the first signal, so as to avoid interference caused by the abnormal first signal to the operation of the gate driving circuit 20. Therefore, compared with a case in which only one (group of) pins that can load a signal to the gate driving circuit 20 are disposed, the second output pin 302 in the gate control chip 30 in this embodiment may load the second signal to the gate driving circuit 20 when the first signal is abnormal, so as to avoid an abnormal operation of the gate driving circuit 20, thereby improving reliability of the operation of the gate driving circuit 20 and improving the yield of the display module 100.

Figure 3:
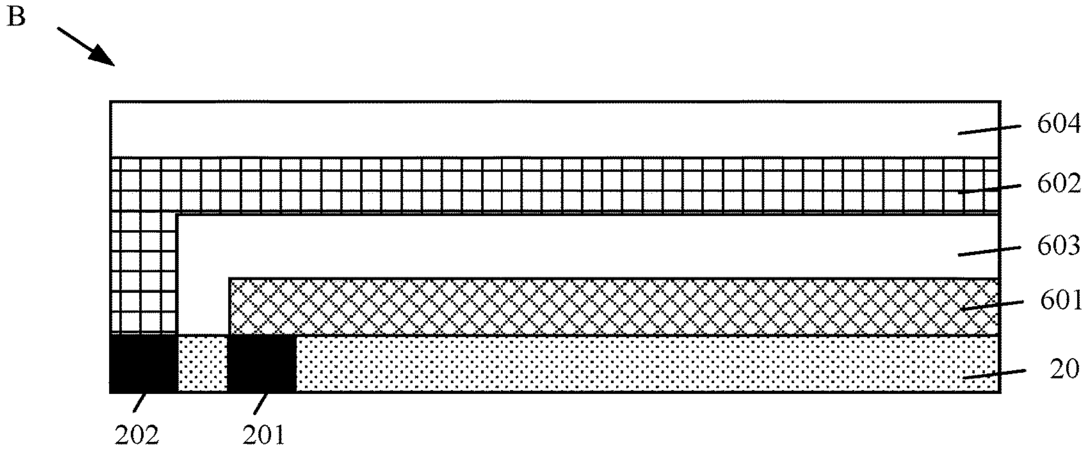
FIG. 3 is a schematic cross-sectional view of a display module according to an embodiment of the present disclosure.

In an embodiment, in combination with FIG. 1 to FIG. 3, the panel 10 includes: an array substrate layer including the gate driving circuit 20; a first circuit layer located on the array substrate layer and including a first line 601, where the first line 601 is electrically connected between the first output pin 301 and the gate driving circuit 20; and a second circuit layer located on the array substrate layer and including a second line 602, where the second line 602 is electrically connected between the second output pin 302 and the gate driving circuit 20, and the first circuit layer is disposed at different layers and insulated from the second circuit layer.

Specifically, as shown in FIG. 3, the gate driving circuit 20 may include a first access point 201 and a second access point 202 that are insulated from each other in the non-display region B. For example, the first line 601 may be disposed in contact with the array substrate layer to be electrically connected to the first access point 201, so that the first output pin 301 is electrically connected to the gate driving circuit 20. The second line 602 located on a side of the first circuit layer away from the array substrate layer may be electrically connected to the second access point 202 by using a via technology, so that the second output pin 302 is electrically connected to the gate driving circuit 20. An insulation layer 603 may be disposed between the first line 601 and the second line 602 to be insulated from each other. A color film layer 604 may further be disposed on a side of the second circuit layer away from the array substrate layer, so as to achieve a color display in combination with light emitted by the plurality of sub-pixels.

It may be understood that the first line 601 and the second line 602 in this embodiment may be located in the non-display area B. Further, the first line 601 and the second line 602 may be disposed opposite to the gate driving circuit 20, so as to be electrically connected to the gate driving circuit 20. In addition, the first line 601 may be disposed at a different layer from the second line 602, which may also avoid increasing a width of the non-display area B, thereby facilitating an implementation of a narrow border. In combination with the foregoing, when the first signal is outputted from the first output pin 301, the first signal may be transmitted to the gate driving circuit 20 by the first line 601. When the second signal is outputted from the second output pin 302, the second signal may be transmitted to the gate driving circuit 20 by the second line 602, so as to implement driving of the gate driving circuit 20 in real time.

In an embodiment, as shown in FIG. 2, the gate control chip 30 further includes: a first input pin 303; and an identification module 304, where the first input pin 303 is electrically connected between the first output pin 301 and the identification module 304, and the identification module 304 is configured to identify when the first signal is abnormal, control the second output pin 302 to output the second signal, and control the first output pin 301 not to output the first signal. On the periphery of the gate control chip 30, the first input pin 303 may be electrically connected to the first output pin 301 by a first conductive part 501, so as to receive the first signal outputted from the first output pin 301. Inside of the gate control chip 30, the identification module 304 may be electrically connected to the first input pin 303 by a second conductive part 502, so as to receive the input first signal.

It should be noted that, before the identification module 304 receives the first signal or when the identification module 304 identifies that the first signal is normal, the first output pin 301 may output the first signal, and the second output pin 302 that has not received an indication from the identification module 304 may not output the second signal. That is, in this case, the first output pin 301 still outputs the first signal and loads the first signal into the gate driving circuit 20 to drive the gate driving circuit 20. In combination with the foregoing, when the identification module 304 identifies that the first signal is abnormal, the second output pin 302 may be controlled to output and load the second signal into the gate driving circuit 20, and the first output pin 301 may be controlled not to output the first signal, so as to avoid interference caused by the abnormal first signal to the operation of the gate driving circuit 20. Therefore, based on the foregoing description, in this embodiment, the identification module 304 is disposed to obtain and identify the first signal, and the second signal may be loaded to the gate driving circuit 20 when the first signal is abnormal, so as to avoid an abnormal operation of the gate driving circuit 20, thereby improving reliability of the operation of the gate driving circuit 20 and improving the yield of the display module 100.

Figure 4:
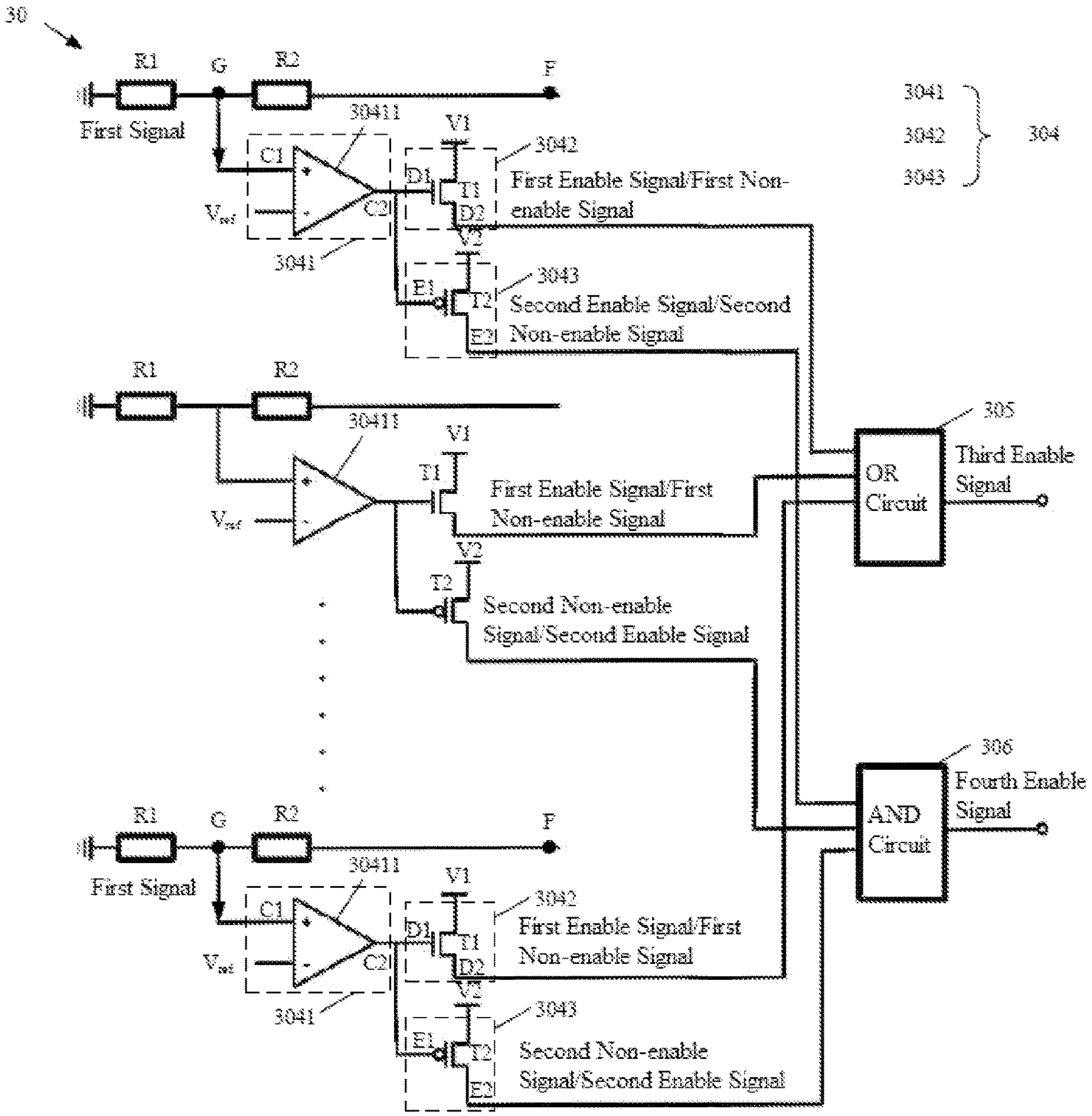
FIG. 4 is a schematic diagram of an internal structure of a gate control chip according to an embodiment of the present disclosure.

In an embodiment, in combination with FIG. 2 and FIG. 4, the identification module 304 includes: an identification unit 3041, of which an input end C1 is electrically connected to the first input pin 303 to receive the first signal; a first output unit 3042, of which a control end D1 of the first output unit 3042 is electrically connected to an output end C2 of the identification unit 3041, for outputting a first enable signal from a first output end D2 of the first output unit 3042 to control the second output pin 302 to output the second signal when the first signal is abnormal; and a second output unit 3043, of which a control end E1 is electrically connected to the output end C2 of the identification unit, for outputting a second non-enable signal from the second output end E2 of the second output unit 3043 to control the first output pin 301 not to output the first signal when the first signal is abnormal.

Specifically, as shown in FIG. 4, the input end C1 of the identification unit 3041 may receive the first signal. Further, the identification module 304 in this embodiment further includes a first output unit 3042 of which a control end D1 is electrically connected to the output end C2 of the identification unit 3041, and a second output unit 3043 of which a control end E1 is electrically connected to the output end C2 of the identification unit 3041. In combination with an identification function of the identification unit 3041, as shown in FIG. 2 and FIG. 4, when the first signal is abnormal, the first output unit 3042 may control the first output end D2 of the first output unit 3042 to output the first enable signal to control the second output pin 302 to output the second signal, and the second output unit 3043 may control the second output end E2 of the second output unit 3043 to output the second non-enable signal to control the first output pin 301 not to output the first signal. That is, when the first signal is abnormal, the gate control chip 30 outputs the second signal instead of the first signal to maintain a normal operation of the gate driving circuit 20.

In an embodiment, in combination with FIG. 2 and FIG. 4, the first output unit 3042 is further configured to output a first non-enable signal from the first output end D2 to control the second output pin 302 not to output the second signal when the first signal is not abnormal. The second output unit 3043 is further configured to, when the first signal is not abnormal, output a second enable signal from the second output end E2 to control the first output pin 301 to output the first signal. Similarly, in combination with the foregoing, when the first signal is not abnormal, the first output unit 3042 may control the first output end D2 of the first output unit 3042 to output the first non-enable signal to control the second output pin 302 not to output the second signal, and the second output unit 3043 may control the second output end E2 of the second output unit 3043 to output the second enable signal to control the first output pin 301 to output the first signal. That is, when the first signal is not abnormal, the gate control chip 30 still maintains the first signal and refrains from outputting the second signal to maintain a normal operation of the gate driving circuit 20.

In an embodiment, in combination with FIG. 2 and FIG. 4, the gate control chip 30 includes a plurality of the identification modules 304. The gate control chip 30 further includes an OR circuit 305, of which an input end is electrically connected to a plurality of the first output ends D2, for outputting a third enable signal from an output end of the OR circuit 305 to control the second output pin 302 to output the second signal when the first signal is abnormal and an AND circuit 306, of which an input end of is electrically connected to a plurality of the second output ends E2, for outputting a fourth enable signal from an output end of the AND circuit 305 to control the first output pin to output the first signal when the first signal is not abnormal.

In combination with FIG. 2 and FIG. 4, the gate control chip 30 may also include a plurality of the first output pin 301, a plurality of second output pins 302, and a plurality of first input pins 303, where, each of the plurality of identification modules 304 corresponds to corresponding one the first output pins 301, corresponding one of the second output pins 302, and corresponding one of the first input pins 303. Correspondingly, each of the first output pins 301 may transmit a corresponding first signal to a corresponding first input pin 303, and each of the second output pins 302 may output a corresponding second signal. That is, each of the identification modules 304 may be electrically connected to the corresponding first input pin 303 to identify the corresponding first signal. The plurality of first signals may include, but are not limited to, a field periodic signal STV and clock signals CK1 to CK8.

Specifically, according to a characteristic of the OR circuit 305, the at least one first output end D2 outputs a high potential, then the OR circuit 305 outputs the high potential. Based on the foregoing first enable signal being a high potential signal, that is, when the at least one first signal is abnormal, at least one of the first output end D2 may output a first enable signal of the high potential signal, and may control the output end of the OR circuit 305 to output the third enable signal of the high potential signal. The foregoing functions may be implemented, that is, "the first enable signal in the solution of the single identification module 304 controls the second output pin 302 to output the second signal, and the third enable signal in the solution of the plurality of identification modules 304 controls the second output pin 302 to output the second signal". That is, an effect of the first enable signal in the solution of the single identification module 304 is the same as an effect of the third enable signal in the solution of the plurality of identification modules 304.

Specifically, according to a characteristic of the AND circuit 306, each of the second output ends E2 outputs a high potential, then the AND circuit 306 outputs the high potential. Based on the foregoing second enable signal being a high potential signal, that is, when each of the first signals is not abnormal, each of the second output ends E2 may output the second enable signal of the high potential signal, and may control the output end of the AND circuit 306 to output the fourth enable signal of the high potential signal. The foregoing functions may be implemented, that is, "the second enable signal in the solution of the single identification module 304 controls the second output pin 301 to output the first signal, and the fourth enable signal in the solution of the plurality of identification modules 304 controls the first output pin 301 to output the first signal". That is, an effect of the second enable signal in the solution of the single identification module 304 is the same as an effect of the fourth enable signal in the solution of the plurality of identification modules 304.

In an embodiment, in combination with FIG. 2 and FIG. 4, the identification unit 3041 includes a voltage comparator 30411, where a first input end of the voltage comparator 30411 is configured as an input end C1 of the identification unit 3041, a second input end of the voltage comparator 30411 is loaded with a reference voltage $V_{ref}$, and an output end of the voltage comparator 30411 is configured as an output end C2 of the identification unit 3041. The first output unit 3042 includes a first transistor T1, where a gate of the first transistor T1 is configured as a control end D1 of the first output unit 3042, a source of the first transistor T1 is loaded with a first voltage V1, and a drain of the first transistor T1 is configured as a first output end D2. The second output unit 3043 includes a second transistor T2, where a gate of the second transistor T2 is configured as a control end E1 of the second output unit 3043, a source of the second transistor T2 is loaded with a second voltage V2, and a drain of the second transistor T2 is configured as a second output end E2.

It may be known from the foregoing that the voltage comparator 30411 in this embodiment may control the first transistor T1 and the second transistor T2 to be turned on or off by comparing a voltage value corresponding to the first signal with a reference voltage $V_{ref}$, and determine values of the first enable signal, the first non-enable signal, the second enable signal, and the second non-enable signal in combination with specific values of the first voltage V1 and the second voltage V2.

Specifically, an example in which the first transistor T1 is an N-type transistor and is turned on when the voltage value corresponding to the first signal is greater than the reference voltage $V_{ref}$ and the second transistor T2 is a P-type transistor and is turned off when the voltage value corresponding to the first signal is less than the reference voltage $V_{ref}$ is used for description herein. Further, as shown in FIG. 4, the gate control chip 30 further includes a first resistor R1, where the first resistor R1 is connected in series to a second resistor R2, the second resistor R2 may be understood as a resistor of a line electrically connected to the first output pin 301 in the gate control chip 30, a node of the first resistor R1 that is not connected to the second resistor R2 is grounded, and a node F of the second resistor R2 that is not connected to the first resistor R1 has a voltage $V_F$, that is, the first resistor R1 and the second resistor R2 share the voltage $V_F$. Therefore, when a short circuit occurs on the line electrically connected to the first output pin 301 in the gate control chip 30, the second resistor R2 is decreased, and a voltage distributed across the first resistor R1 is increased, that is, a voltage at a connection point G of the first resistor R1 and the second resistor R2 is increased. The first signal is a signal outputted from the first output pin 301, or a signal inputted to the first input pin 303, that is, the voltage at the connection point G of the first resistor R1 and the second resistor R2 in FIG. 4.

It may be understood that, the input end C1 of the identification unit 3041 in this embodiment may receive the voltage at the connection point G of the first resistor R1 and the second resistor R2 being the same as the first signal. In combination with the foregoing, when the first signal is abnormal, that is, a line electrically connected to the first output pin 301 in the gate control chip 30 is short-circuited, the second resistor R2 is decreased, that is, the voltage received at the input end C1 of the identification unit 3041 is increased. It may be considered that the voltage at the first input end of the voltage comparator 30411 is greater than the reference voltage $V_{ref}$, that is, the first transistor T1 is turned on. The first voltage V1 is transmitted to the first output end D2 via the first transistor T1, that is, the first voltage V1 is used as the foregoing first enable signal to control the second output pin 302 to output the second signal. In addition, the second transistor T2 is turned on, and the second output end E2 is in a floating state. That is, the voltage at the second output end E2 may be used as the foregoing second non-enable signal to control the first output pin 301 not to output the first signal.

Similarly, when the first signal is not abnormal, that is, the line electrically connected to the first output pin 301 in the gate control chip 30 is not short-circuited, the second resistor R2 is larger, that is, the voltage received at the input end C1 of the identification unit 3041 is smaller. It may be considered that the voltage at the first input end of the voltage comparator 30411 is less than the reference voltage $V_{ref}$, that is, the second transistor T2 is turned on. The second voltage V2 is transmitted to the second output end E2 via the second transistor T2, that is, the second voltage V2 is used as the foregoing second enable signal to control the first output pin 301 to output the first signal. In addition, the first transistor T1 is turned on, and the first output end D2 is in a floating state. That is, the voltage at the first output end D2 may be used as the foregoing first non-enable signal to control the second output pin 302 not to output the second signal.

In an embodiment, in combination with FIGS. 1 to 4, the display module 100 further includes a power management chip 4012. The gate control chip 30 further includes a second input pin 307 electrically connected to the power management chip 4012 to receive a third signal. The gate control chip 30 is configured to output the first signal or the second signal according to the third signal. Specifically, in combination with the foregoing, the power management chip 4012 may transmit the target gate control signal to the gate control chip 30 by using the line located on the first circuit board 401, the first connector 403, the second connector 406, and the line located on the second circuit board 402. The third signal herein is the target gate control signal. It should be noted that, after powered on, the second input pin 307 needs to be electrically connected to the first output pin 301 in combination with the first input pin 303 so that the gate control chip 30 may receive and identify the first signal. The second output pin 302 that does not receive an indication from the gate control chip 30 may be electrically disconnected from the first output pin 301 to not output the second signal. That is, the first output pin 301 still output and load the first signal to the gate driving circuit 20 to drive the gate driving circuit 20. Further, based on whether the first signal being abnormal, the gate control chip 30 outputs the first signal or the second signal.

In an embodiment, in combination with FIGS. 1 to 4, the gate control chip 30 further includes: a first switching transistor, where a gate of the first switching transistor is electrically connected to the first output end D2, a source of the first switching transistor is electrically connected to the second input pin 307, and a drain of the first switching transistor is electrically connected to the second output pin 302; and a second switching transistor, where a gate of the second switching transistor is electrically connected to the second output end E2, a source of the second switching transistor is electrically connected to the second input pin 307, and a drain of the second switching transistor is electrically connected to the first output pin 301. In this embodiment, an example that both the first switching transistor and the second switching transistor are N-type transistors and are turned on when the gates of the first switching transistor and the second switching transistor are at a high voltage is taken.

It can be known from the foregoing that, when the first signal is abnormal, the first output end D2 outputs the first enable signal of the high potential signal to control the second output pin 302 to output the second signal. That is, it may be considered that a voltage value of the high potential signal is equal to the foregoing high voltage. Further, in this embodiment, the first switching transistor may be disposed to be turned on, so that the second input pin 307 is electrically connected to the second output pin 302, that is, the second output pin 302 may output the second signal. In the meanwhile, the second output end E2 outputs a second non-enable signal that is not a high potential signal, so as to control the first output pin not to output the first signal. Further, in this embodiment, the second switching transistor may be disposed to be turned off, so that the second input pin 307 is electrically disconnected from the first output pin 301, that is, the first output pin 301 may not output the first signal.

It can be known from the foregoing that, when the first signal is not abnormal, the first output end D2 outputs a first non-enable signal that is not a high potential signal, so as to control the second output pin not to output the second signal. Further, in this embodiment, the first switching transistor may be disposed to be turned off, so that the second input pin 307 is electrically disconnected from the second output pin 302, that is, the second output pin 302 may not output the second signal. In addition, the second output end E2 outputs the second enable signal that is the high-potential signal, so as to control the first output pin to output the first signal. Further, in this embodiment, the second switching transistor may be disposed to be turned on, so that the second input pin 307 is electrically connected to the first output pin 301, that is, the first output pin 301 may output the first signal.

Further, when the gate control chip 30 includes a plurality of identification modules 304, and a plurality of first output pins 301, a plurality of second output pins 302, and a plurality of first input pins 303 that are in a one-to-one correspondence with the plurality of identification modules 304, instead of the first output end D2, the output end of the OR circuit 305 may be electrically connected to the gate of the first switching transistor. Similarly, instead of the second output end E2, the output end of the OR circuit 306 may be electrically connected to the gate of the second switching transistor. The specific operation principle may refer to the foregoing related descriptions about the OR circuit 305, the AND circuit 306, the first switching transistor, and the second switching transistor.

An embodiment of the present disclosure provides an electronic terminal. The electronic terminal includes the display module according to any one of the foregoing descriptions.

The present disclosure provides the display module and the electronic terminal, including, the panel including the display area and the non-display area on at least one side of the display area, wherein the gate driving circuit is disposed in the non-display area; and the gate control chip including the first output pin and the second output pin, wherein both the first output pin and the second output pin are electrically connected to the gate driving circuit; wherein, the gate control chip is configured to, when the first signal outputted from the first output pin is abnormal, control the second output pin to output the second signal, and control the first output pin not to output the first signal. In the present disclosure, by disposing the gate control chip that has a function of identifying the first signal and includes the first output pin and the second output pin that are both electrically connected to the gate driving circuit, the gate control chip may load the second signal to the gate driving circuit instead of the first signal when the first signal is abnormal, thereby avoiding the abnormal operation of the gate driving circuit, improving reliability of the operation of the gate driving circuit, and improving the yield of the display module.

The display module and the electronic terminal provided in the embodiments of the present disclosure are described in detail above. In this specification, principles and implementations of the present disclosure are illustrated by applying specific examples herein. The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A display module, comprising:

a panel including a display area and a non-display area located on at least one side of the display area, wherein a gate driving circuit is disposed in the non-display area; and a gate control chip including a first output pin and a second output pin, wherein both the first output pin and the second output pin are electrically connected to the gate driving circuit;

wherein, the gate control chip is configured to, when a first signal outputted from the first output pin is abnormal, control the second output pin to output a second signal, and control the first output pin not to output the first signal;

wherein, the panel includes:

an array substrate layer including the gate driving circuit;

a first circuit layer, located on the array substrate layer, including a first line, wherein the first line is electrically connected between the first output pin and the gate driving circuit;

a second circuit layer, located on the array substrate layer, including a second line, wherein the second line is electrically connected between the second output pin and the gate driving circuit, and the first circuit is disposed at a different layer from and insulated from the second circuit;

wherein, the gate control chip further includes:

a first input pin; and an identification module, wherein the first input pin is electrically connected between the first output pin and the identification module, and the identification module is configured to identify when the first signal is abnormal, control the second output pin to output the second signal, and control the first output pin not to output the first signal;

wherein the identification module includes:

an identification unit, wherein an input end of the identification unit is electrically connected to the first input pin to receive the first signal;

a first output unit, wherein a control end of the first output unit is electrically connected to an output end of the identification unit, for outputting a first enable signal from a first output end of the first output unit to control the second output pin to output the second signal when the first signal is abnormal; and a second output unit, wherein a control end of the second output unit is electrically connected to the output end of the identification unit, for outputting a second non-enable signal from a second output end of the second output unit to control the first output pin not to output the first signal when the first signal is abnormal;

wherein the first output unit is further configured to output a first non-enable signal from the first output unit to control the second output pin not to output the second signal when the first signal is not abnormal; and the second output unit is further configured to output a second enable signal from the second output unit to control the first output pin to output the first signal when the first signal is not abnormal;

wherein the gate control chip includes a plurality of the identification module, and the gate control chip further includes:

an OR circuit, wherein an input end of the OR circuit is electrically connected to a plurality of the first output end, for outputting a third enable signal from an output end of the OR circuit when the first signal is abnormal to control the second output pin to output the second signal; and an AND circuit, wherein an input end of the AND circuit is electrically connected to a plurality of the second output end, for outputting a fourth enable signal from an output end of the AND circuit when the first signal is not abnormal to control the first output pin to output the first signal.

2. The display module of claim 1, wherein the identification unit includes a voltage comparator, and wherein a first input end of the voltage comparator is configured as the input end of the identification unit, a second input end of the voltage comparator is loaded with a reference voltage, and an output end of the voltage comparator is configured as the output end of the identification unit;

the first output unit includes a first transistor, wherein a gate of the first transistor is configured as the control end of the first output unit, a source of the first transistor is loaded with a first voltage, and a drain of the first transistor is configured as the first output end;

the second output unit includes a second transistor, wherein a gate of the second transistor is configured as the control end of the second output unit, a source of the second transistor is loaded with a second voltage, and a drain of the second transistor is configured as the second output end.

3. The display module of claim 1, further comprising a power management chip, and the gate control chip further includes:

a second input pin, electrically connected to the power management chip, to receive a third signal;

wherein, the gate control chip is configured to output the first signal or the second signal based on the third signal.

4. The display module of claim 3, wherein the gate control chip further includes:

a first switching transistor, wherein a gate of the first switching transistor is electrically connected to the first output end, a source of the first switching transistor is electrically connected to the second input pin, and a drain of the first switching transistor is electrically connected to the second output pin; and a second switching transistor, wherein a gate of the second switching transistor is electrically connected to the second output end, a source of the second switching transistor is electrically connected to the second input pin, and a drain of the second switching transistor is electrically connected to the first output pin.

5. A display module, comprising:

a panel including a display area and a non-display area located on at least one side of the display area, wherein a gate driving circuit is disposed in the non-display area; and a gate control chip including a first output pin and a second output pin, wherein both the first output pin and the second output pin are electrically connected to the gate driving circuit;

wherein, the gate control chip is configured to, when a first signal outputted from the first output pin is abnormal, control the second output pin to output a second signal, and control the first output pin not to output the first signal;

wherein the gate control chip further includes:

a first input pin; and an identification module, wherein the first input pin is electrically connected between the first output pin and the identification module, and the identification module is configured to identify when the first signal is abnormal, control the second output pin to output the second signal, and control the first output pin not to output the first signal;

wherein the identification module includes:

an identification unit, wherein an input end of the identification unit is electrically connected to the first input pin to receive the first signal;

a first output unit, wherein a control end of the first output unit is electrically connected to an output end of the identification unit, for outputting a first enable signal from a first output end of the first output unit when the first signal is abnormal to control the second output pin to output the second signal; and a second output unit, wherein a control end of the second output unit is electrically connected to the output end of the identification unit, for outputting a second non-enable signal from a second output end of the second output unit when the first signal is abnormal to control the first output pin not to output the first signal;

wherein the first output unit is further configured to output a first non-enable signal from the first output unit to control the second output pin not to output the second signal when the first signal is not abnormal; and the second output unit is further configured to output a second enable signal from the second output unit to control the first output pin to output the first signal when the first signal is not abnormal;

wherein the gate control chip includes a plurality of the identification module, and the gate control chip further includes:

an OR circuit, wherein an input end of the OR circuit is electrically connected to a plurality of the first output end, for outputting a third enable signal from an output end of the OR circuit to control the second output pin to output the second signal when the first signal is abnormal; and an AND circuit, wherein an input end of the AND circuit is electrically connected to a plurality of the second output end, for outputting a fourth enable signal from an output end of the AND circuit to control the first output pin to output the first signal when the first signal is not abnormal.

6. The display module of claim 5, wherein the panel includes:

an array substrate layer including the gate driving circuit;

a first circuit layer, located on the array substrate layer, including a first line, wherein the first line is electrically connected between the first output pin and the gate driving circuit;

a second circuit layer, located on the array substrate layer, including a second line, wherein the second line is electrically connected between the second output pin and the gate driving circuit, and the first circuit is disposed at a different layer from and insulated from the second circuit.

7. The display module of claim 5, wherein the identification unit includes a voltage comparator, and wherein a first input end of the voltage comparator is configured as the input end of the identification unit, a second input end of the voltage comparator is loaded with a reference voltage, and an output end of the voltage comparator is configured as the output end of the identification unit;

the first output unit includes a first transistor, wherein a gate of the first transistor is configured as the control end of the first output unit, a source of the first transistor is loaded with a first voltage, and a drain of the first transistor is configured as the first output end; and the second output unit includes a second transistor, wherein a gate of the second transistor is configured as the control end of the second output unit, a source of the second transistor is loaded with a second voltage, and a drain of the second transistor is configured as the second output end.

8. The display module of claim 5, further comprising a power management chip, and the gate control chip further includes:

a second input pin, electrically connected to the power management chip, to receive a third signal;

wherein, the gate control chip is configured to output the first signal or the second signal based on the third signal.

9. The display module of claim 8, wherein the gate control chip further includes:

a first switching transistor, wherein a gate of the first switching transistor is electrically connected to the first output end, a source of the first switching transistor is electrically connected to the second input pin, and a drain of the first switching transistor is electrically connected to the second output pin; and a second switching transistor, wherein a gate of the second switching transistor is electrically connected to the second output end, a source of the second switching transistor is electrically connected to the second input pin, and a drain of the second switching transistor is electrically connected to the first output pin.

10. An electronic terminal, comprising a display module:

a panel including a display area and a non-display area located on at least one side of the display area, wherein a gate driving circuit is disposed in the non-display area; and a gate control chip including a first output pin and a second output pin, wherein both the first output pin and the second output pin are electrically connected to the gate driving circuit;

wherein, the gate control chip is configured to, when a first signal outputted from the first output pin is abnormal, control the second output pin to output a second signal, and control the first output pin not to output the first signal;

wherein the gate control chip further includes:

a first input pin; and an identification module, wherein the first input pin is electrically connected between the first output pin and the identification module, and the identification module is configured to identify when the first signal is abnormal, control the second output pin to output the second signal, and control the first output pin not to output the first signal;

wherein the identification module includes:

an identification unit, wherein an input end of the identification unit is electrically connected to the first input pin to receive the first signal;

a first output unit, wherein a control end of the first output unit is electrically connected to an output end of the identification unit, for outputting a first enable signal from a first output end of the first output unit when the first signal is abnormal to control the second output pin to output the second signal; and a second output unit, wherein a control end of the second output unit is electrically connected to the output end of the identification unit, for outputting a second non-enable signal from a second output end of the second output unit when the first signal is abnormal to control the first output pin not to output the first signal;

wherein the first output unit is further configured to output a first non-enable signal from the first output unit to control the second output pin not to output the second signal when the first signal is not abnormal; and the second output unit is further configured to output a second enable signal from the second output unit to control the first output pin to output the first signal when the first signal is not abnormal;

wherein the gate control chip includes a plurality of the identification module, and the gate control chip further includes:

an OR circuit, wherein an input end of the OR circuit is electrically connected to a plurality of the first output end, for outputting a third enable signal from an output end of the OR circuit to control the second output pin to output the second signal when the first signal is abnormal; and an AND circuit, wherein an input end of the AND circuit is electrically connected to a plurality of the second output end, for outputting a fourth enable signal from an output end of the AND circuit to control the first output pin to output the first signal when the first signal is not abnormal.

11. The electronic terminal of claim 10, wherein the panel includes:

an array substrate layer including the gate driving circuit;

a first circuit layer, located on the array substrate layer, including a first line, wherein the first line is electrically connected between the first output pin and the gate driving circuit;

a second circuit layer, located on the array substrate layer, including a second line, wherein the second line is electrically connected between the second output pin and the gate driving circuit, and the first circuit is disposed at a different layer from and insulated from the second circuit.

12. The electronic terminal of claim 10, further comprising a power management chip, and the gate control chip further includes:

a second input pin, electrically connected to the power management chip, to receive a third signal;

wherein, the gate control chip is configured to output the first signal or the second signal based on the third signal.

13. The electronic terminal of claim 12, wherein the gate control chip further includes:

a first switching transistor, wherein a gate of the first switching transistor is electrically connected to the first output end, a source of the first switching transistor is electrically connected to the second input pin, and a drain of the first switching transistor is electrically connected to the second output pin; and a second switching transistor, wherein a gate of the second switching transistor is electrically connected to the second output end, a source of the second switching transistor is electrically connected to the second input pin, and a drain of the second switching transistor is electrically connected to the first output pin.

* * * * *